United States Patent [19]
Böhle

[11] Patent Number: 5,626,667
[45] Date of Patent: May 6, 1997

[54] PROCESS AND APPARATUS FOR PRODUCING SO₂-CONTAINING GAS AND CEMENT CLINKER FROM WASTE GYPSUM

[75] Inventor: Hartwig Böhle, Ludwigsau, Germany

[73] Assignee: Babcock BSH Aktiengesellschaft, Krefeld, Germany

[21] Appl. No.: 524,418

[22] Filed: Sep. 6, 1995

[30] Foreign Application Priority Data

Sep. 16, 1994 [DE] Germany ............... 44 33 049.9

[51] Int. Cl.⁶ ........................................ C04B 11/02
[52] U.S. Cl. .................. 106/745; 106/772; 106/775; 106/780; 423/522
[58] Field of Search ..................... 106/745, 772, 106/775, 780; 588/257; 210/603, 188; 423/522

[56] References Cited

U.S. PATENT DOCUMENTS

| | | | |
|---|---|---|---|
| 4,627,877 | 12/1986 | Ogawa et al. | 106/745 |
| 5,169,617 | 12/1992 | Clemens et al. | 106/775 |

FOREIGN PATENT DOCUMENTS

| | | | |
|---|---|---|---|
| 13472 | 7/1957 | Germany. | |
| 3222865C3 | 1/1983 | Germany. | |
| 3222721A1 | 12/1983 | Germany. | |
| 3222721 | 12/1983 | Germany. | |
| 3622688A1 | 1/1988 | Germany. | |
| 289036 | 4/1991 | Germany. | |
| 294009 | 9/1991 | Germany. | |
| 298769 | 3/1992 | Germany. | |
| 4340382 | 6/1994 | Germany. | |
| 4243763 | 6/1994 | Germany. | |
| 1112180 | 5/1968 | United Kingdom | 106/745 |

*Primary Examiner*—Paul Marcantoni
*Attorney, Agent, or Firm*—Herbert Dubno

[57] ABSTRACT

A method and apparatus for producing SO₂-containing gas and cement clinker by splitting waste gypsum and anhydrite, using paper fibers as the reducing agent, and firing the splitting residue with additives. The cement forming additives are formed into a mixture with the anhydrite and the mixture is compacted before the final drying and calcining, whereupon the anhydrite containing mixture is subjected to the splitting reaction and firing to form the clinker.

12 Claims, 2 Drawing Sheets

5,626,667

PROCESS AND APPARATUS FOR PRODUCING SO$_2$-CONTAINING GAS AND CEMENT CLINKER FROM WASTE GYPSUM

FIELD OF THE INVENTION

The present invention relates to a process and apparatus for producing SO$_2$-containing gas and cement clinker from waste gypsum. More particularly this invention relates to the recovery of a cement material highly suitable for use in construction and SO$_2$-containing gas which also may have significant utility in the chemical industry (e.g. for the production of sulfuric acid) from a waste product which is a significant problem when disposed of in landfills and the like.

BACKGROUND OF THE INVENTION

In the desulfurization of flue gases and in the production of phosphoric acid, a waste gypsum is produced which is a significant problem with respect to disposal. The term "waste gypsum" is here used to describe the solid product which is a residue of the desulfurization of flue gases in power plants and elsewhere or which is produced in phosphoric acid processes and which consists of calcium sulfate and mixtures of calcium sulfate and calcium sulfite or mixtures of these with other residues or calcium sulfite itself as a residue from such processes.

From German Patent DE-C 32 22 721, a process for transforming the waste gypsum to SO$_2$-containing gas and cement clinker is known in which the gypsum is first converted to an anhydrite, e.g. by drying and calcination, and the anhydrite is mixed with additives useful in the production of cement clinker. The decomposition is carried out in a rotary furnace or kiln which generates a product gas from the cleavage or splitting of the calcium sulfate or calcium sulfite which is high in SO$_2$ and carbon dioxide, the solid residue CaO reacting with the additives to form the cement clinker.

In this case, the decomposition of the anhydrite is carried out under reducing conditions and the reducing agent is coke.

For this process to be effective, it is important to insure a high degree of decomposition of the anhydrite and this can also insure that the permissible sulfate concentration in the clinker does not exceed a maximum permissible level. If the sulfate content of the clinker exceeds such maximum, melting occurs during the clinker formation and the clinker cannot then be readily milled to form the cement clinker. As a consequence, the high quality of the clinker depends on a high degree of dissociations of the anhydrite.

This could not always be ensured with earlier processes.

OBJECTS OF THE INVENTION

It is, therefore, the principal object of the present invention to provide a process for producing SO$_2$-containing gas and cement clinker from waste gypsum whereby the drawbacks of earlier systems are avoided and, in particular, a sufficiently high degree of decomposition or dissociation of the anhydrite is insured.

Another object of the invention is to provide an improved apparatus for carrying out the process, thereby also yielding a particularly high degree of dissociation of the anhydrite.

Still another object of the invention is a process and apparatus for disposing of waste gypsum where drawbacks of earlier systems can be avoided.

SUMMARY OF THE INVENTION

These objects are attained, in accordance with the invention in a process for producing SO$_2$-containing gas and cement clinker from waste gypsum in which, in an initial step or steps, the waste gypsum is converted to an anhydrite.

The anhydrite in the presence of a reducing agent is dissociated, split or decomposed into the SO$_2$-containing gas and a residue, the residue is burned (fired) together with additives and, during this burning process, cement clinker is formed. According to the invention, paper fibers are used as the reducing agent in decomposing the anhydrite.

In its apparatus aspects, therefore, before the units for drying the waste gypsum and calcining it, a mixer is provided for the mixing of moist waste gypsum, paper pulp and the additives and is followed by a device for mechanically dewatering the wet mixture at least in part utilizing a pressing operation. Upstream of the rotary furnace, a tube furnace can be provided for the continuous drying of the gypsum in conjunction with a rotary drum for the oxidation and calcination of the waste gypsum, followed by a mixer for forming a mixture of the anhydrite, a dry paper fiber and additives in an alternative to the wet process.

More particularly, the process of the invention can comprise the steps of:

(a) transforming waste gypsum into a calcium sulfate anhydrite;

(b) decomposing the anhydrite in the presence of paper fibers as a reducing agent into an SO$_2$-containing gas and a decomposition residue;

(c) admixing cement-forming additives with the residue to form a mixture; and (d) firing the mixture to form cement clinker therefrom.

An apparatus in one aspect of the invention can comprise:

a mixer for mixing moist waste gypsum, paper pulp containing paper fibers constituting a reducing agent for the decomposition of a gypsum anhydrite and cement-clinker-forming additives to form a wet mixture;

means connected to the mixer for mechanically dewatering the wet mixture to produce a dewatered mixture;

means receiving the dewatered mixture for drying and calcining the gypsum thereof to form the anhydrite; and a rotary furnace downstream of the means for drying and calcining for reacting the anhydrite in the mixture to decompose the anhydrite to an SO$_2$-containing gas and a residue which is reacted with the additives in the rotary furnace to produce cement clinker.

In another aspect of the invention, the apparatus can comprise:

a flow tube drier for drying waste gypsum;

a rotary drum receiving dried waste gypsum from the flow tube drier for calcining the dried waste gypsum to form an anhydrite;

a mixer for mixing the anhydrite, dry paper fibers and cement-clinker-forming additives to obtain a mixture; and a rotary furnace receiving the mixture and decomposing the anhydrite to yield SO$_2$-containing gas and a residue reacting with the additives to form cement clinker.

The use of paper fibers enables an extremely fine distribution of the reducing agent in the mass of waste gypsum or anhydrite and the fine distribution, in turn, improves the kinetics of the decomposition process, thereby assuring a high degree of decomposition of the anhydrite.

As has already been indicated, with a high degree of decomposition the quality of the cement clinker is improved. A high degree of decomposition also gives rise to a higher concentration of $SO_2$ in the decomposition gases and facilitates the fabrication of sulfuric acid from the $SO_2$-containing gas which may result, together with a flue gas resulting from combustion of a fuel for the rotary furnace.

According to a feature of the invention, compacts are formed from the mixture of the anhydrite paper fibers and additives, the compacts enhancing the kinetics of the decomposition process. The compacts can be briquettes, granules or other pieces, preferably formed by pressing. The pieces may be subdivided from the compacted mixture or portions of the mixture may be compacted to form the shaped bodies.

Preferably the shaped bodies have edge lengths between 1 and 10 mm and a dry density of 0.8 to 1.5 g/cm$^3$.

According to the invention, the compacts can be shaped bodies, e.g. as taught in German Patent Document DE-A 13 472 or DE-A 42 4376.3. The shaped bodies can be formed in a press. With the use of paper fibers as the reducing agent and using higher densities of the compact mixture an improvement of the kinetics of the decomposition process can be obtained.

The process of the invention also has the advantage that it can reduce the cost of treating the waste gypsum or producing the $SO_2$-containing gas and cement clinker therefrom. For example, DE-C 32 22 721 describes the high energy cost and high cost of the reducing agent. It is known from DD-A 13 472 and DD-A 298 769 to reduce process costs by the addition of waste materials like bituminous coal or lignite slag, lignite power plant filter ashes or high-ash flue gas desulfurization products as additives in the decomposition of the gypsum. According to the invention, the paper fibers derive from scrap paper, thereby enabling a waste material to be utilized at a significant cost saving.

According to a feature of the invention, the proportion of paper fibers to the anhydrite should correspond to a carbon content of the paper fibers which is 3.4 to 6.0 weight percent of the anhydrite. This ratio maximizes the degree of decomposition of the anhydrite. With a carbon proportion less than 3.4 weight percent there is insufficient reducing agent present to obtain complete transformation of the anhydrite. Higher proportions than 6.0 weight percent do not give any increase in the degree of decomposition but rather can result in the formation of calcium sulfide (CaS) which can be detrimental to the quality of the cement clinker.

As to the paper fibers, more than 50% should have a fiber length less than or equal to 1 mm. This insures an especially fine distribution of the reducing agent and thus good reaction kinetics and a high degree of conversion of the anhydrite to sulfur dioxide and calcium oxide.

It has been found to be advantageous to comminute the paper in a wet milling process to paper fibers with a fiber length of 50 to 150 μm. The fine paper fibers in the resulting pulp are mixed with moist waste gypsum and the mixture of the waste gypsum, the paper pulp and the additives for forming the cement clinker is advantageously milled together to insure a uniform distribution of the fine paper fibers in the mixture. The mixture is then mechanically dewatered, dried and calcined. This process has been found to be particularly advantageous for the treatment of calcium sulfate as recovered from more modern flue gas desulfurization plants in which the flue gas desulfurization gypsum is completely oxidized. Mention should be made of DE-A 43 30 382 which describes, for the fabrication of cement clinker, the dewatering of a slurry mixture, drying and calcining.

It has proven to be advantageous to dewater the mixture at least in part by pressing it, this system having the advantage that it provides a compacted mixture. The shapes imparted to the mixture can result from subdividing this compacted mixture into pieces, e.g. by subdividing the filter cake.

According to a feature of the invention, the calcination of the anhydrite is carried out under a reducing atmosphere. This prevents premature combustion of the paper fibers. False air can be eliminated and a reducing atmosphere created by adding dry paper fibers to the mixture and burning them.

According to a feature of the invention the process includes the steps, prior to decomposition of the anhydrite, of:

i. drying the waste gypsum;
ii. oxidizing the dried waste gypsum in an oxygen atmosphere and calcining the dried waste gypsum; and
iii. mixing the oxidized and calcined dried waste gypsum with said paper fibers and said additives.

The use of an oxygen containing atmosphere during the calcination allows oxidation of any calcium sulfite in the waste gypsum. This treatment is especially important for waste gypsum from old flue gas desulfurization plants which contain a mixture of sulfate and sulfite. The paper fibers are then combined in a dry state with the additives and the anhydrite.

The mixture of the anhydrite, paper fibers and additives can be compacted and shaped. A press for compacting the mixture can utilize smooth or profiled rolls in a roll press and the compact can then be broken up by jaw breakers or pin rolls. A press with shaping dyes can also be used with compact and shape the mixture.

To avoid dust formation and to improve the degree of decomposition, prior to decomposition, fines are sifted from the compacts. The fines can be recycled to the press process.

The apparatus of the invention can comprise a belt filter with a pressing belt and a pin roll to form and breakup the compacts. Dewatering has been found to be especially effective with this apparatus.

For drying and calcination, a belt dryer and a rotary drum can be provided, the latter insuring removal of free water and crystal water in a energy efficient system. The indirect heating of the rotary furnace can utilize a tube bundle through which the $SO_2$-containing gas is guided so that the waste heat from this gas can be utilized for calcination of the waste gypsum.

BRIEF DESCRIPTION OF THE DRAWING

The above and other objects, features, and advantages will become more readily apparent from the following description, reference being made to the accompanying drawing in which.

SPECIFIC DESCRIPTION

EXAMPLE 1

Wet Process

Figure 1:
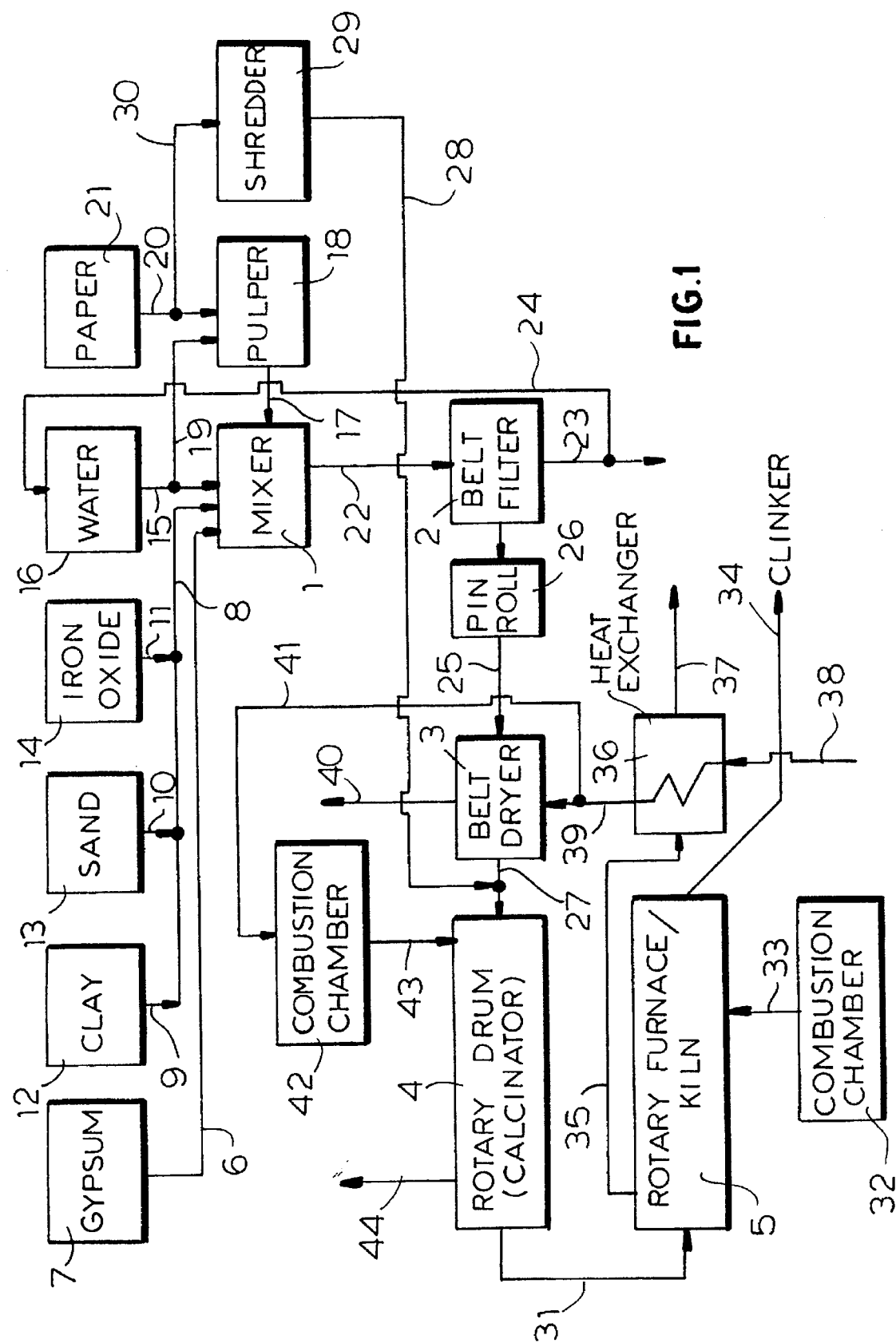
FIG. 1 is a flow diagram illustrating a process according to the invention with wet comminutor of the scrap paper.

The apparatus for carrying out the wet process has been illustrated diagrammatically in FIG. 1. The apparatus for producing $SO_2$-containing gas and cement clinker from waste gypsum, in this case, utilizes wet milled paper fibers as the reducing agent and comprises a mixer 1 for the mixing of moist waste gypsum, paper pulp and additives which, can be fired to form cement clinker.

Downstream of the mixer 1 is a device for mechanically dewatering the wet mixture, namely, a belt fixture 2, a dryer for drying the mechanically dewatered mixture, namely, a belt dryer 3, and a rotary furnace which has been referred to above and referred to subsequently as a rotary drum 4 in which the waste gypsum can be calcined to produce the anhydrite. The mixture is then fed to a rotary furnace or kiln 5 for decomposing the gypsum and forming the clinker.

The mixer 1 can be any conventional mixer, for example, a pin mixer.

The mixer 1 is supplied via line 6 with the waste gypsum from a supply bin 7 and by a manifold line 8 into which ducts 9, 10 and 11 open with $Al_2O_3$(clay), sand and iron oxide respectively from the supply bins 12, 13 and 14 for the clay, sand and iron oxide.

A water line 15 from a water tank 16 and a supply line 17 delivering paper pulp from a pulper 18, also open into the mixer. The pulper receives paper via line 20 from the storage bin 21.

From the mixer 1 a line 22 runs to the belt filter 2. The belt filter is provided with a spreading device for spreading the slurry mixture on an endless perforated belt. For dewatering, a suction box is provided beneath this belt and, advantageously, the belt filter 2 can also include a pressing device which can press the solids into a filter cake and thereby make a compact from the mixture. The press can be provided with pressing rolls or a press platen and can be provided at the upstream part of the filter above the conveyor and pressing belts. A line 23 carries water expressed from the filter cake back to a water treatment unit. The line 23 is branched at 24 to the water tank 16.

The belt filter 2 is connected via a line 25 with the belt dryer 3. Along the line 25, a device for breaking up the filter cake is provided in the form of a pin roll 26. The line 25 itself may be a conveyor belt. The pin roll 26 may be provided directly downstream of the belt filter 2 above the conveyor belt previously mentioned.

The pin roll 26 is so configured that the filter cake is broken up into pieces with a side length less than or equal to 30 mm and preferably less than or equal to 10 mm.

The belt dryer 3 has an endless sieve belt and a feeder for hot gas above or below the belt.

From the belt dryer 3 a path 27 carries the broken up compact mixture to the rotary drum 4. In this path 27 or directly into the rotary drum 4, the paper feeder 28 opens. The paper feeder 28 is connected with a paper mill, for example, a tearing wolf 29 for the dry comminutation of paper. A line 30 branched from the paper supply line 20 is connected to the tearing wolf so that the tearing wolf 29 can also be supplied with paper from the supply vessel 21. From the rotary drum 4, a path 31 is connected to the rotary kiln 5. This path 31 can be a downcomer shaft which connects the rotary drum 4 with the kiln 5.

The rotary kiln 5 is formed as a counterflow furnace, i.e. hot gas from a combustion chamber 32 passes via line 33 into the rotary kiln 5, i.e. at the discharge end thereof. At this end a duct 34 discharges the cement clinker.

Remote from the gas inlet 33 is a duct 35 for carrying off the $SO_2$-containing gas. The $SO_2$-containing gas and any heating medium which exits at the inlet end of the furnace 5, can pass through a heat exchanger 36.

At the discharge side of the heat exchanger 36, the $SO_2$-containing gas is fed at 37 to a sulfuric acid plant. The heat exchanger 36 is supplied with fresh air at 38 and the heated air at 39 is fed to the belt dryer 3 or, as preheated combustion air, to the combustion chamber 42 whose gas discharge line 43 is connected to the rotary drum or calcinator 4.

The rotary drum 4 is thus connected to the connector 42 to be directly heated in a concurrent flow mode, the hot gases flowing through the rotary drum 4 in the same directions as the solids. A line 44 discharges the flue gases at the discharge end of the drum 4.

In operation, moist waste gypsum, e.g. with a moisture content of 10%, and consisting predominantly of calcium sulfate dihydrate, is recovered from a relatively modern flue gas desulfurization plant in which the scrubbing is effected under oxidizing conditions or which has previously been pretreated in an oxidation stage. To produce the paper fibers, scrap paper and preferably scrap newspaper is comminuted wet from the supply bin 21 with the additional water in the pulper 18. The fiber lengths resulting from this wet comminution of paper, is approximately 50 to 150 μm. The paper pulp is admitted together with the waste gypsum, additives and water to the mixer 1.

The paper fibers fed to the mixer are used in such proportion to the anhydrite that the carbon content of the paper fibers makes up 3.4 to 6.0% by weight of the anhydrite. The carbon content of newspaper is about 40% so that the amount of dry paper used is approximately 8.5 to 15% by weight of the anhydrite.

The additives, clay, sand or quartz meal and iron oxide ($Fe_2O_3$) are used in such amounts that the cement clinker results with a lime standard I of 60 to 110, a silicate modulus of 2.3 to 2.8 and a clay modulus of 1.5 to 4.0. The additives, of course, are based upon the limestone content and the fly ash content of the waste gypsum.

The mixture from the mixer 1, for example, with a moisture content of 75%, is supplied via line 22 to the belt filter 2 and is supplied onto the conveyor belt thereof. With the help of suction boxes the mixture is mechanically dewatered in the belt filter to a moisture content of 20 to 32%. The thickness of the filter cake at the end of the belt filter can amount to 10 to 15 mm and can be dried to a dry density without pressing of 0.6 to 0.9 g/cm$^3$, for example 0.8 g/cm$^3$.

For cement clinker with a higher lime standard I, a press is used as described and the dry density of the filter cake raised to 0.8 g/cm$^3$ to 1.5 g/cm$^3$, preferably about 1.2 g/cm$^3$. In other words the dry density of the filter cake at the end of the filter 2 could have a value in the range of 0.6 to 1.5 g/cm$^3$.

After leaving the belt filter 2, the filter cake is broken up by the pin wheel 26 into pieces having a side length less than or equal to 30 mm. Preferably, however, the pin roll 26 subdivides the compact mixture into pieces with an addition of less than or equal to 10 mm. The subdivision should be effective without smearing of the dewatered mixture. The ability of the filter cake to break up depends upon the waste gypsum used and the additives.

The compacted mixture, i.e. the pieces of filter cake, are dried by direct contact with heat and gas in a belt dryer on a perforated belt at a temperature of 100° to 130° C. to a moisture content of less than or equal to 2%. If necessary, the filter cake after the belt dryer 3 will be subdivided further with additional pin rolls into smaller pieces, namely, equal to or less than 10 mm in size.

The mixture is then introduced into the rotary drum 4. In the rotary drum calcium sulfate in the mixture is converted to the anhydrite by direct contact with hot gas in a reducing atmosphere. The hot gas is generated in the combustion chamber 42 and past in concurrent flow with the mixture through the rotary drum 4. Initially residual moisture is removed and then the dihydrate is calcined to the anhydrite. The temperature of the product during calcination is 300 to 400° C. To burn away excess air and retain a reducing atmosphere in the kiln 4 additional paper fibers can be burned therein. The amount of paper fibers can be 12 to 17 grams, preferably 15 grams per volume % of oxygen and $m^3$ of flue gas.

The hot compact mixture of anhydrite, paper fibers and additives are transferred by a downcomer and gravity into the rotary kiln 5. In the rotary kiln 5 the mixture is fired by direct contact with counterflowing hot gas. The mixture is thus initially brought to a temperature in a reducing atmosphere of about 1200° C. in a first stage and then is heated in a second stage to a temperature of about 1400° C. In the first stage there is a decomposition of the anhydrite to $SO_2$ and $CO_2$ and, as a residue CaO is formed utilizing the carbon from the paper as the reducing agent. The residual CaO is burned with the additives to form clinker along with other residues from the waste gypsum and the paper.

The hot gas for use in the gypsum decomposition and clinker formation is formed in the combustion chamber 32 and flows through the rotary kiln 5 in counterflow to the solids. It carries off the $SO_2$ and $CO_2$ resulting from the decomposition of the anhydrite. The gas is passed through the heat exchanger 36 which recovers heat to heat fresh air and the cooled $SO_2$-containing gas is passed to the sulfuric acid plant. A part of the air heated in the heat exchanger 36 is fed to the belt dryer 3 and there is used for the direct drying of the pieces of the filter cake. The balance of the air heated in the heat exchanger 36 is fed to the combustion chamber 42 as combustion system air. The following tables show the conditions of the process in more detail:

A waste gypsum comprised of 97% calcium sulfate dihydrate and small amounts of fly ash contains silicon dioxide, aluminum oxide, iron oxide and calcium oxide which are taken into consideration in determining the additives.

For the mixture, such proportions of additives are chosen which corresponds to the lime standard I of 100.1, a silicate modulus of 2.6 and an aluminum oxide modulus of 2.3.

The paper used is scrap newspaper with a moisture content of 8% (absolute, dry) as well as fillers and extenders. The carbon content amounts to 37% is (absolute, dry).

The molecular ratio of the content of the paper fibers and the anhydrite amounts to 0.7.

The mixture is so compacted in the dewatering that it has a dry density of 1.2 $g/cm^3$. In the $SO_2$ splitting and clinker forming reactions, the mixture is converted into product and gas and clinker with the compositions shown in the Tables. If the carbon is completely oxidized with additional oxygen, the $CO/CO_2$ quantity in the reaction gas is increased by a factor of 1.3. The compacted mixture with a density of 1.2 $g/cm^3$ gives a degree of splitting of 98% (i.e. the conversion of $CaSO_4$ to $SO_2$ is 98%). The calcium sulfate content in the clinker is at most 2% and the calcium sulfide content in the clinker is at most 0.1%.

In conventional decomposition of gypsum to $SO_2$ and clinker formation with usual heating gases, the $SO_2$ concentration in the splitting gas is about 9.2 vol.-%.

If there is no additional compaction during the dewatering, the mixture has a dry density of 0.9 $g/cm^3$ and the splitting degree is reduced, with the same composition of the mixture, to about 80%.

If the composition of the mixture is changed to increase the lime standard I of 70, the splitting degree can be raised in a mixture of a density 0.9 $g/cm^3$ to 98%.

The rotary drum 4 can be replaced by an indirectly heated rotary furnace with tube bundles for the heating gas which are parallel to the rotary axis.

In this case, the heat exchanger 36 and the combustion chamber 42 can be eliminated and the line 35 can run

| | | STARTING SUBSTANCES | | | | | | |
|---|---|---|---|---|---|---|---|---|
| | $CaSO_4$ | $H_2O$/CW | $SiO_2$ | $Al_2O_3$ | $Fe_2O_3$ | CaO | C | Balance |
| | | MIXTURE | | | | | | |
| WASTE GYPSUM | 77.8 | 78.1 | 20.4 | 0.3 | 0.1 | 0.1 | | 1.0 |
| PAPER FIBERS | 10.3 | | 52.9 | | | | 36.2 | 10.9 |
| CLAY | 6.7 | | 10.4 | 52.2 | 32.0 | 1.4 | 0.5 | 3.5 |
| QUARTZ | 4.4 | | | 99.5 | 0.2 | 0.1 | | 0.2 |
| $Fe_2O_3$ | 0.8 | | | 0.2 | 0.2 | 99.0 | | 0.6 |

| | | PRODUCTS | | | | |
|---|---|---|---|---|---|---|
| | | $SO_2$ | $C/CO/CO_2$ | | | |
| $SO_2$-Cont. Gas | | 39.5 | 72.4 | 27.6 | | |
| | | CaO | $SiO_2$ | $Al_2O_3$ | $Fe_2O_3$ | Bal. |
| CLINKER | 38.1 | 68.1 | 21.4 | 5.8 | 2.5 | 2.2 |
| $H_2O$ | 22.4 | | | | | |

CW - combined water directly to feed heating gas to the rotary drum 4. The waste heat of the gas stream containing the splitting gas from the rotary drum 4 can be used for the calcination of the waste gypsum. To heat the belt dryer 3 an additional heating device can be used.

EXAMPLE 2

Dry Process

Figure 2:
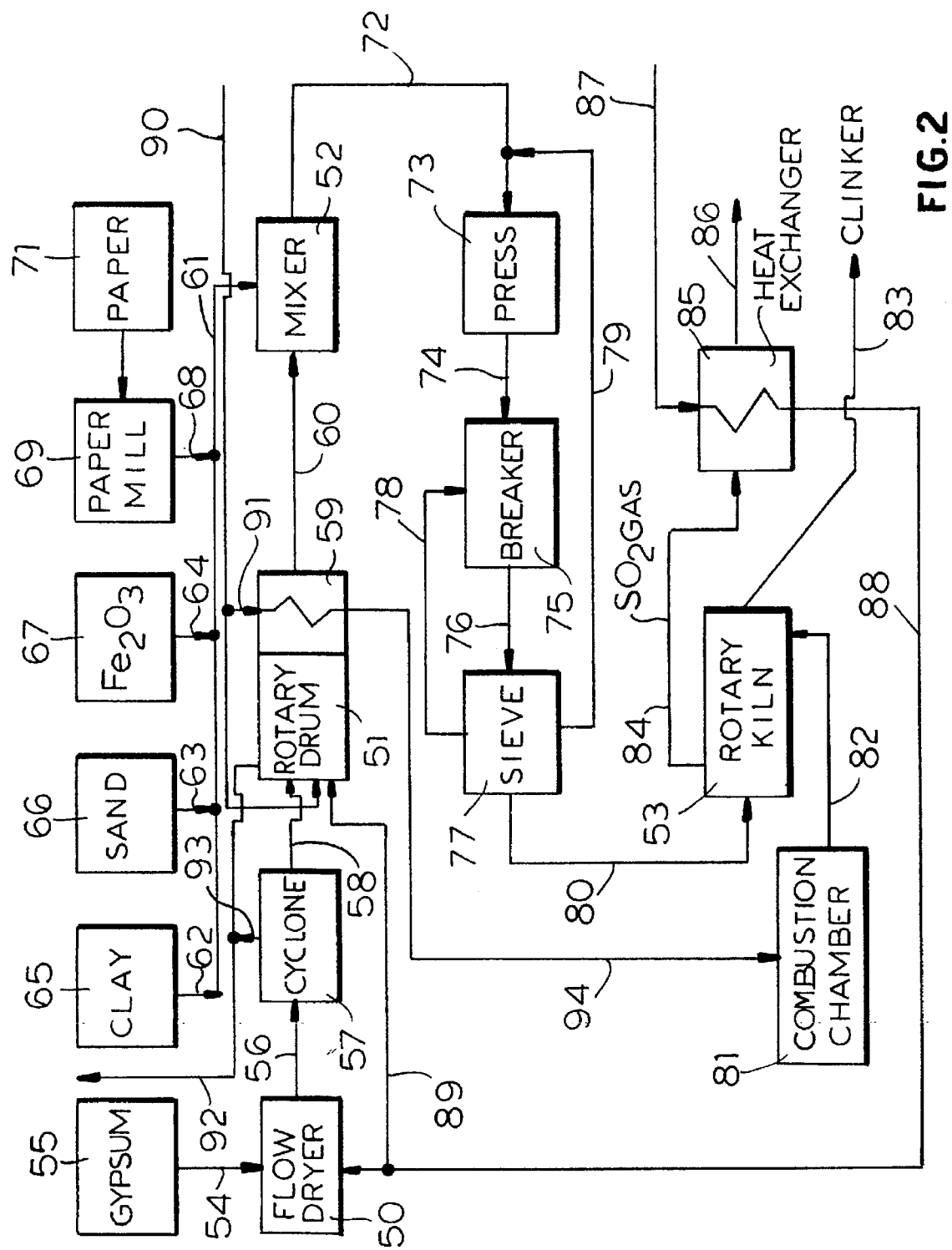
FIG. 2 is a flow diagram of the process of the invention utilizing a dry comminution to produce the paper fibers.

The apparatus utilized is that of FIG. 2 and the system for producing $SO_2$-containing gas (supplying gas) and cement clinker, utilizes waste gypsum with dry comminuted paper fiber as the reducing agent. The apparatus comprises in succession, a device for dry and calcining the waste gypsum, namely, a flow tube 50 for drying and a rotary drum for calcining the waste gypsum. A mixer 52 mixes the anhydrite, dry paper fiber and additives and a rotary kiln 53 is provided for splitting the anhydrite to form the splitting gas and for producing the clinker.

A conduit 54 from a supply bin 55 for the waste gypsum opens into the flow dryer 50. A conduit 56 leads from the flow dryer 50 to a cyclone 57 from the outlet of which a duct 58 is connected to the rotary drum 51.

The rotary drum 51, like to rotary drum 4 of FIG. 1, is a directly heated concurrent flow furnace with baffles. The rotary drum 51 differs from the rotary drum 4, in that its downstream side is formed as a cooler 59. From the rotary drum 51, a duct 60 is connected with a mixer 52. Into the mixer 52 a manifold 61 opens, the manifold receiving $Al_2O_3$, sand and iron oxide from respective supply bins 65, 66, 67 via lines 62, 63 and 64. A further line 68 connects the paper mill 69 with this manifold. The paper mill 69 is connected via conduit 71 for the scrap paper.

The mixer 52 is formed as a plowshare mixer, i.e. has a drum and a central shaft with mixing elements mounted thereon, the mixing elements having the shape of plowshares. From the mixer 52 a line 72 runs to a device for compacting the mixture The compacting device comprises a press 73 which is connected via line 74 with a breaker 75 for breaking up the compacts formed in the press.

The breaker 75 is provided with a conduit 76 upstream of a sieve 77 having two sieve bottoms with mesh sizes of 10 mm and 1 mm, respectively. The oversize is recycled via line 78 to the breaker and the undersize is returned by line 79 to the press. The compacts of proper size are carried by the conduit 80 to the rotary kiln 53.

The rotary kiln 53 is, like the kiln of FIG. 1, a counterflow furnace. Heating gas is generated in a combustion chamber 81 and supplied via line 82 to the downstream side of the rotary kiln 53. At the upstream side thereof, the splitting gas, i.e. $SO_2$-containing gas is discharged via the duct 84 to a heat exchanger 85 with the cooled gas being discharged at 86. The cooling fluid may be fresh air which is fed through the inlet pipe 87 of the heat exchanger 85 and the warm air pipe 88 and 89 to the flow dryer 50 and the rotary drum 51 respectively.

A line 90 supplies oxidation air to the system and is connected with the rotary drum 51. A branch from line 90 through the cooler 59 supplies heated oxidizing air at 94 to the combustion chamber 81. Mist, fumes and moisture driven off in the rotary drum 51 is discharged at 92 and a further mist and vapor discharge line 93 from the cyclone 92 opens into the discharge stack to which line 92 is connected.

In operation, moist waste gypsum which can be a mixture of calcium sulfite and calcium sulfate and has a moisture content of 20 to 40%, especially around 30%, is used. This gypsum can be recovered from an older flue gas desulfurization plant having no oxidation capabilities. This waste gypsum is dried in the flow tube 50 by heating gas at a temperature of 600° to 800° C., thereby producing a gypsum with a moisture content of at most 2% and a temperature of 100° to 200° C. The dry gypsum is separated in the cyclone 57 from the moisture vapors and is fed to the rotary drum 51 via the line 58.

In the rotary drum 51 the waste gypsum is heated by direct contact with heating gas at a temperature of 600° to 800° C., to a temperature of 400° to 500° C. The heating is accompanied by feeding of oxygen containing air through line 90, to create an oxidizing atmosphere in the rotary drum 51 to oxidize the calcium sulfite. Moisture is driven off from the waste gypsum and water of crystallization is removed.

At the outlet of the rotary drum, the waste gypsum is recovered in the form of anhydrite fed to the cooler 59 and is discharged at a temperature of about 100° C. to the mixer 52.

In the mixer 52, the anhydrite is mixed with paper fiber which is dry milled in the paper mill 69 and with the aluminum oxide, sand and iron oxide components in amounts corresponding to those given in Example 1.

The carbon content of the paper fiber is 3.4 to 6.0 weight % of the anhydrite. In the cement clinker a line standard I of 60 to 110 is maintained and the silicate modulus is held at 2.3 to 2.8 and the aluminum oxide modulus at 1.5 to 4.0. The paper fibers have lengths of up to 4 mm and 30 to 50% of the fiber has a fiber length less than 0.1 mm but at least 50% of the fiber has a fiber length of at most 1 mm.

The mixture is fed to the press 73 in which it is compacted to a density of 1 to 1.5 g/cm³ and the compact is then broken up in the breaker 75 to pieces with a side length of about 1 to 10 mm, i.e. the oversize, and pieces with a side length of less than 1 mm, i.e. the undersize, are recycled as has been mentioned. The classification is done in the sieve 77.

The compacts of the desired particle size from the sieve 77 are fed by a line 80 into the rotary furnace 53. As in Example 1, in a first stage, the anhydrite is reacted with the carbon of the paper fibers to produce an $SO_2$-containing splitting gas and a residue which, in a second stage, is burned with additives to form cement clinker.

The heating gas generated in combustion chamber 81 flows in counterflow to the solid rotary kiln 53 and is cooled in the heat exchanger 85 after picking up the splitting gas and then is fed to a sulfuric acid production plant.

The heat from the gas containing the splitting gas is used to heat the flow dryer 50 and rotary drum 51. The following tables show the compositions of the waste gypsum, the composition of the mixture and the products.

|  | $CaSO_3$ | $CaSO_4$ | $H_2O$/CW | $SiO_2$ | $Al_2O_3$ | $Fe_2O_3$ | CaO | Balance |
|---|---|---|---|---|---|---|---|---|
| WASTE GYPSUM | 75.2 | 9.2 | 1.7 | 0.3 | 0.1 | 0.1 |  | 13.4 |

-continued

| MIXTURE | |
|---|---|
| WASTE GYPSUM | 73.9% |
| PAPER FIBER | 11.9% |
| $Al_2O_3$ | 7.8% |
| QUARTZ | 5.4% |
| $Fe_2O_3$ | 1.0% |

| PRODUCTS | | | |
|---|---|---|---|
| | | $SO_2$ | $C/CO/CO_2$ |
| SPLITTING GAS | 37.9 | 86.6 | 13.4 |

| | | CaO | $SiO_2$ | $Al_2O_3$ | $Fe_2O_3$ | Balance |
|---|---|---|---|---|---|---|
| Clinker | 46.0 | 68.0 | 21.4 | 5.8 | 2.5 | 2.3 |
| $H_2O$ | 16.1 | | | | | |

CW - combined water

The waste gypsum used can contain up to about 93% calcium sulfite and calcium sulfate and up to 81% calcium sulfite hemihydrate and 12% calcium sulfate dihydrate, up to 5% limestone and up to 2% fly ash.

In the gypsum splitting and clinker forming reaction the proportions of the additives for the mixture that, as in Example 1, a lime standard I of 100.1, a silicate modulus 2.6 and $Al_2O_3$ modulus of 2.3 can result. The same proportion of scrap paper can be used as in Example 1 although the paper fibers are here dry. The molecular ratio of carbon in the paper fibers and the anhydrite is 0.7.

With latter at a dry density of 1.2 g/cm³ mixture, a splitting degree of 98% can be achieved with a content in the clinker of calcium sulfate <2% and the sulfide in the clinker being at most 0.1%. The heating gas containing the splitting gas can have an $SO_2$ concentration of 9.2 vol. %.

The dry milled paper fibers are preferably used in aspect of the processes in which the waste gypsum contains large proportions of calcium sulfite or are mixtures of calcium sulfite and calcium sulfate. However, it can also be used where the waste gypsum is exclusively calcium sulfate. In this case, it is not necessary to maintain an oxidizing atmosphere in the rotary drum 51 for dry and calcining. The drum 51 can also be indirectly heated with tube bundles parallel to the rotation axis for the heating gas. In this case the heat exchanger 85 can be omitted and the line 84 supplied directly with the hot gas of the rotary drum 51. The waste heat of the gas containing the splitting gas is given up in the rotary drum 51 and can be used for calcination of the waste gypsum. To heat the flow tube 50 an additional combustion chamber can be provided.

I claim:

1. A process for producing $SO_2$-containing gas and cement clinker from waste gypsum, comprising the steps of:
  (a) transforming waste gypsum into a calcium sulfate anhydrite;
  (b) decomposing said anhydrite in the presence of paper fibers as a reducing agent into an $SO_2$-containing gas and a decomposition residue;
  (c) admixing cement-forming additives with said residue to form a mixture; and
  (d) firing said mixture to form cement clinker therefrom.

2. The process defined in claim 1 wherein said anhydrite, said paper fibers and said additives are formed into a compact mixture, and said compact mixture is reacted to decompose said anhydrite.

3. The process defined in claim 1 wherein said paper fibers are formed by comminuting scrap paper.

4. The process defined in claim 1 wherein said paper fibers are used in a proportion to the anhydrite such that the carbon content of the paper fibers is 3.4 to 6.0 percent by weight of the anhydrite.

5. The process defined in claim 1 wherein said paper fibers are as formed that more than 50% of the paper fibers have a fiber length less than or equal to 1 mm.

6. The process defined in claim 1, further comprising, prior to decomposition of said anhydrite:
  i. wet-comminuting paper to form a pulp of said paper fibers;
  ii. mixing said pulp with moist waste gypsum and said additives;
  iii. mechanically dewatering the mixture of said pulp with moist waste gypsum and said additives;
  iv. drying the mechanically dewatered mixture; and
  v. calcining the dried, mechanically dewatered mixture.

7. The process defined in claim 6 wherein the mechanical dewatering of the mixture of said pulp with moist waste gypsum and said additives includes the step of compacting and forming the mixture of said pulp with moist waste gypsum and said additives.

8. The process defined in claim 6 wherein the calcining is carried out under a reducing atmosphere.

9. The process defined in claim 6 wherein, prior to calcining, additional paper fibers are combined with the dried, mechanically dewatered mixture to burn off false air.

10. The process defined in claim 1 wherein, prior to decomposition of the anhydrite, the process comprises the steps of:
  i. drying the waste gypsum;
  ii. oxidizing the dried waste gypsum in an oxygen atmosphere and calcining the dried waste gypsum; and
  iii. mixing the oxidized and calcined dried waste gypsum with said paper fibers and said additives.

11. The process defined in claim 10, further comprising the step of:

iv. pressing and shaping the mixture of oxidized and calcined dried waste gypsum with said paper fibers and said additives to form compacts thereof which are subjected to decomposition of the anhydrite.

12. The process defined in claim 11, further comprising the step of:

v. sieving fines from the mixture of oxidized and calcined dried waste gypsum with said paper fibers and said additives upon the formation of the compacts prior to decomposition of the anhydrite.

* * * * *